(12) United States Patent
Holmes et al.

(10) Patent No.: US 7,256,510 B2
(45) Date of Patent: Aug. 14, 2007

(54) HYBRID ELECTRO-MECHANICAL TRANSMISSION WITH SINGLE MOTOR/GENERATOR AND METHOD OF CONTROL

(75) Inventors: Alan G. Holmes, Clarkston, MI (US); Michael R. Schmidt, Carmel, IN (US); Donald Klemen, Carmel, IN (US)

(73) Assignee: General Motors Corportion, Detroit, MI (US)

( * ) Notice: Subject to any disclaimer, the term of this patent is extended or adjusted under 35 U.S.C. 154(b) by 55 days.

(21) Appl. No.: 11/317,775

(22) Filed: Dec. 23, 2005

(65) Prior Publication Data

US 2007/0145749 A1    Jun. 28, 2007

(51) Int. Cl.
*F16H 3/72* (2006.01)

(52) U.S. Cl. .............................. 290/45; 475/5; 180/65.1

(58) Field of Classification Search ................ 290/4 R, 290/4 A, 1 C, 1 D, 45; 475/5, 10; 180/65.1
See application file for complete search history.

(56) References Cited

U.S. PATENT DOCUMENTS

| | | | |
|---|---|---|---|
| 4,407,132 A | 10/1983 | Kawakatsu et al. ........... 60/716 |
| 5,713,425 A | 2/1998 | Buschhaus et al. ......... 180/65.2 |
| 5,730,676 A * | 3/1998 | Schmidt ........................ 475/5 |
| 5,839,533 A | 11/1998 | Mikami et al. .............. 180/165 |
| 5,856,709 A | 1/1999 | Ibaraki et al. ................. 290/45 |
| 5,937,757 A | 8/1999 | Jackson et al. ............. 101/232 |
| 6,098,733 A | 8/2000 | Ibaraki et al. .............. 180/65.2 |
| 6,488,608 B2 | 12/2002 | Yamaguchi et al. ........... 477/3 |
| 6,527,658 B2 | 3/2003 | Holmes et al. ................. 475/5 |
| 6,527,659 B1 | 3/2003 | Klemen et al. ................ 475/5 |
| 6,551,208 B1 * | 4/2003 | Holmes et al. ................. 475/5 |
| 6,592,484 B1 | 7/2003 | Tsai et al. ...................... 475/5 |
| 6,994,646 B2 * | 2/2006 | Ai .................................. 475/5 |
| 7,128,675 B2 * | 10/2006 | Klemen et al. ................ 475/5 |

* cited by examiner

*Primary Examiner*—Nicholas Ponomarenko

(57) ABSTRACT

An electro-mechanical transmission is provided having only a single motor/generator, at least one differential gear set and two torque-transmitting mechanisms. A first of the torque-transmitting mechanisms is selectively engageable to establish a first continuously variable operating mode and a second of the torque-transmitting mechanisms selectively engageable to establish a second continuously variable operating mode and a synchronous shift between the two operating modes is achievable. A method of control is provided in which vehicle operating characteristics are analyzed to identify a target operating state in terms of operating mode and ratio based on the available motor torque and motor power and on maximizing energy efficiency. The transmission is controlled to approach this operating mode as closely as possible and the diverge away from the optimum torque operating with zero net battery use as the battery charge of the battery connected with the motor/generator accumulates or depletes.

17 Claims, 5 Drawing Sheets

| MODE | | B1 | B2 | C1 | C2 |
|---|---|---|---|---|---|
| V1 | 1st VARIABLE RANGE | | | ON | |
| V2 | 2nd VARIABLE RANGE | | | | ON |
| F1 | 1st FIXED RATIO | ON | | | ON |
| F2 | 2nd FIXED RATIO | | | ON | ON |
| F3 | 3rd FIXED RATIO | | ON | ON | |

| MODE | | B1 | B2 | C1 | C2 |
|---|---|---|---|---|---|
| V1 | 1st VARIABLE RANGE | | | ON | |
| V2 | 2nd VARIABLE RANGE | | | | ON |
| F1 | 1st FIXED RATIO | ON | | | ON |
| F2 | 2nd FIXED RATIO | | | ON | ON |
| F3 | 3rd FIXED RATIO | | ON | ON | |

| MODE | | B1 | B2 | B3 | B4 | C1 | C2 |
|---|---|---|---|---|---|---|---|
| E1 | ELECTRIC ONLY MODE | | | | ON | ON | |
| V1 | 1st VARIABLE RANGE | | | | | ON | |
| V2 | 2nd VARIABLE RANGE | | | | | | ON |
| F1 | 1st FIXED RATIO | ON | | | | OR | OR |
| F2 | 2nd FIXED RATIO | | ON | | | | ON |
| F3 | 3rd FIXED RATIO | | | | | ON | ON |
| F4 | 4th FIXED RATIO | | | ON | | ON | |

# HYBRID ELECTRO-MECHANICAL TRANSMISSION WITH SINGLE MOTOR/GENERATOR AND METHOD OF CONTROL

TECHNICAL FIELD

The present invention relates to electrically variable transmissions having a single electric motor/generator and a method of control therefore.

BACKGROUND OF THE INVENTION

Internal combustion engines, particularly those of the reciprocating piston type, currently propel most vehicles. Such engines are relatively efficient, compact, lightweight, and inexpensive mechanisms by which to convert highly concentrated energy in the form of fuel into useful mechanical power. A novel transmission system, which can be used with internal combustion engines and which can reduce fuel consumption and emissions, may be of great benefit to the public.

The wide variation in the demands that vehicles typically place on internal combustion engines increases fuel consumption and emissions beyond the ideal case for such engines. Typically, a vehicle is propelled by such an engine, which is started from a cold state by a small electric motor and relatively small electric storage batteries, then quickly placed under the loads from propulsion and accessory equipment. Such an engine is also operated through a wide range of speeds and a wide range of loads and typically at an average of approximately a fifth of its maximum power output.

A vehicle transmission typically delivers mechanical power from an engine to the remainder of a drive system, such as fixed final drive gearing, axles and wheels. A typical mechanical transmission allows some freedom in engine operation, usually through alternate selection of five or six different drive ratios, a neutral selection that allows the engine to operate accessories with the vehicle stationary, and clutches or a torque converter for smooth transitions between driving ratios and to start the vehicle from rest with the engine turning. Transmission gear selection typically allows power from the engine to be delivered to the rest of the drive system with a ratio of torque multiplication and speed reduction, with a ratio of torque reduction and speed multiplication known as overdrive, or with a reverse ratio.

An electric generator can transform mechanical power from the engine into electrical power, and an electric motor can transform that electric power back into mechanical power at different torques and speeds for the remainder of the vehicle drive system. This arrangement allows a continuous variation in the ratio of torque and speed between engine and the remainder of the drive system, within the limits of the electric machinery. An electric storage battery used as a source of power for propulsion may be added to this arrangement, forming a series hybrid electric drive system.

The series hybrid system allows the engine to operate with some independence from the torque, speed and power required to propel a vehicle, so the engine may be controlled for improved emissions and efficiency. This system allows the electric machine attached to the engine to act as a motor to start the engine. This system also allows the electric machine attached to the remainder of the drive train to act as a generator, recovering energy from slowing the vehicle into the battery by regenerative braking. A series electric drive suffers from the weight and cost of sufficient electric machinery to transform all of the engine power from mechanical to electrical in the generator and from electrical to mechanical in the drive motor, and from the useful energy lost in these conversions.

A power-split transmission can use what is commonly understood to be "differential gearing" to achieve a continuously variable torque and speed ratio between input and output. An electrically variable transmission can use differential gearing to send a fraction of its transmitted power through a pair of electric motor/generators. The remainder of its power flows through another, parallel path that is all mechanical and direct, of fixed ratio, or alternatively selectable.

One form of differential gearing, as is well known to those skilled in this art, may constitute a planetary gear set. Planetary gearing is usually the preferred embodiment employed in differentially geared inventions, with the advantages of compactness and different torque and speed ratios among all members of the planetary gear set. However, it is possible to construct this invention without planetary gears, as by using bevel gears or other gears in an arrangement where the rotational speed of at least one element of a gear set is always a weighted average of speeds of two other elements.

A hybrid electric vehicle transmission system also includes one or more electric energy storage devices. The typical device is a chemical electric storage battery, but capacitive or mechanical devices, such as an electrically driven flywheel, may also be included. Electric energy storage allows the mechanical output power from the transmission system to the vehicle to vary from the mechanical input power from the engine to the transmission system. The battery or other device also allows for engine starting with the transmission system and for regenerative vehicle braking.

An electrically variable transmission in a vehicle can simply transmit mechanical power from an engine input to a final drive output. To do so, the electric power produced by one motor/generator balances the electrical losses and the electric power consumed by the other motor/generator. By using the above-referenced electrical storage battery, the electric power generated by one motor/generator can be greater than or less than the electric power consumed by the other. Electric power from the battery can sometimes allow both motor/generators to act as motors, especially to assist the engine with vehicle acceleration. Both motors can sometimes act as generators to recharge the battery, especially in regenerative vehicle braking.

SUMMARY OF THE INVENTION

A reduced cost, compact hybrid electro-mechanical transmission having only a single motor/generator is provided. Benefits of an electro-mechanical transmission, such as emissions reductions and fuel economy improvement, may be realized while cost reduction is possible due to the elimination of a second motor/generator. Additionally, the hybrid electro-mechanical transmission herein accomplishes synchronous shifting between continuously variable operating modes. (As used herein, a "mode" is a particular operating state, whether encompassing a continuous range of speed ratios or only a fixed speed ratio, achieved by engagement of a particular torque-transmitting mechanism or torque-transmitting mechanisms.) In other words, the transmission offers synchronous shifting between variable ranges, thus optimizing shift feel and passenger comfort.

Synchronous shifting means that torque-transmitting mechanisms used in an off-going speed ratio are released as torque-transmitting mechanisms used in an on-coming speed ratio are engaged, while the relative speeds of the two operative parts of each of the torque-transmitting mechanisms are very low (essentially zero). Because only a single motor/generator is employed, its ability to provide power (when acting as a motor) and to receive power (when acting as a generator) is limited by the energy storage capacity of a battery from which the single motor/generator receives power for powering the transmission or to which the motor/generator delivers power that is received from the transmission. Accordingly, a method described below permits control of the transmission at optimal energy efficiency in light of the limitations of the battery.

Specifically, an electro-mechanical transmission within the scope of the invention includes an input member to receive power from an engine and output member for delivering power from the transmission. The transmission also includes a single motor/generator. A "single motor/generator" means that the transmission is characterized by an absence of any other motor/generators that affect power flow between the input member and the output member. The transmission also includes at least one differential gear set having a plurality of members including a first, a second and a third member. The differential gear set may a simple planetary gear set, a compound planetary gear set or multiple planetary gear sets may be employed. The input member and the motor/generator are each operatively connectable with different members of the differential gear set, either continuously or selectively via torque-transmitting mechanisms.

At least two continuously variable operating modes are achieved by the transmission. A first torque-transmitting mechanism is selectively engageable to establish a first continuously variable operating mode that has a first preferred range of speed ratios. A second torque-transmitting mechanism is selectively engageable to establish a continuously variable operating mode that is characterized by a second preferred range of speed ratios. Preferably, the first torque-transmitting mechanism connects the single motor/generator with one of the members of the differential gear set and engagement of the second torque-transmitting mechanism connects the single motor/generator with another member of the differential gear set. The speed of the output member is a combination of the speed of the input member and the speed of the motor/generator. As is well understood by those skilled in the art, in a continuously variable operating mode, power is provided by the engine and also flows from or to the motor/generator. Having more than one continuously variable operating mode reduces the amount of motor/generator power necessary to control the speed ratio through the transmission from input member to output member.

Synchronous shifting between the continuously variable operating modes is provided, that is engagement of one of the first and second torque-transmitting mechanisms and disengagement of the other of the first and second torque-transmitting mechanisms to shift between the respective continuously variable operating modes occurs at essentially the same time and when the relative speeds of the two components of each of the first and second torque-transmitting mechanisms is essentially zero. This synchronous shifting operation contrasts with most prior art transmissions, wherein the entire shift event includes substantial relative speeds across at least one torque transmitting mechanism. Preferably, a number of fixed speed ratios are also achievable by engaging other torque-transmitting mechanisms, as will be further described below. Some of these fixed speed ratios reverse the direction between of the output member relative to the input member, and the continuously variable operating modes may be used to reverse the direction of the output member.

The differential gear set and the interconnections of the input member, the output member, the single motor/generator and the various torque-transmitting mechanisms are best described by a lever analogy. Specifically, within the scope of the invention, the differential gear set is represented by a first lever of a lever diagram having at least three nodes, that is a first, a second and a third node. When only one simple planetary gear set is employed, the lever has only these three nodes. In this instance, the first torque-transmitting mechanism is a clutch and is selectively engageable to connect the input member with the first node. The second torque-transmitting mechanism is also a clutch and is selectively engageable to connect the input member with the second node. The motor/generator is operatively connected with the third node. A third clutch is selectively engageable to operatively connect the output member with the second node. A fourth clutch is selectively engageable to operatively connect the output member with the first node. A first brake is selectively engageable to ground the third node to a stationary member such as the transmission housing. Engagement of the first and third clutches establishes the first continuously variable operating mode whereas engagement of the second and fourth clutches establishes the second continuously variable operating mode. Furthermore, the additional clutches and the brake allow fixed operating modes. For instance, engagement of the first and third clutches as well as the brake establishes a first fixed forward speed ratio. Engagement of either the first or the second clutch as well as both of the third and fourth clutches established a second fixed forward speed ratio. Alternatively, the second fixed forward speed ratio may be established by engagement of both of the first and second clutches and only one of the third and fourth clutches. Engagement of the second and fourth clutches as well as the brake establishes a third fixed forward speed ratio.

Alternatively, instead of a simple planetary gear set, the transmission may employ a compounded planetary gear set such as a Simpson gear set, represented by a lever diagram with a four node lever having a first, a second, a third and a fourth node. In this instance, the input member is continuously connected with the first node and the output member is continuously connected with the second node. Engagement of the first torque-transmitting mechanism connects the motor/generator with the third node whereas engagement of the second torque-transmitting mechanism connects the motor/generator with the fourth node.

In one embodiment having a four node lever, the first and second torque-transmitting mechanisms are first and second clutches, respectively. A first brake is selectively engageable to ground the third node to the stationary member and a second brake is selectively engageable to ground the fourth node to the stationary member. Engagement of the first brake establishes a first fixed forward speed ratio whereas engagement of the first clutch and the second clutch establishes a second fixed forward speed ratio. Engagement of the second brake establishes a third fixed forward speed ratio.

In an alternative embodiment, the differential gearing of the transmission may be characterized by a five node lever including the four nodes described above and an additional fifth node. In one embodiment of a transmission within the scope of the invention, the first and second torque-transmitting mechanisms are first and second clutches, respectively, the first brake is selectively engageable to operatively connect the fifth node with the stationary member and the second brake is selectively engageable to operatively connect the third node with the stationary member. Additionally, a third brake is selectively engageable to operatively connect the fourth node with the stationary member. Four fixed forward speed ratios are achievable. Specifically, engagement of the first brake will establish a first fixed forward speed ratio. Engagement of the second brake establishes a second fixed forward speed ratio. Engagement of both of the first and second clutches establishes a third fixed forward speed ratio. Engagement of the third brake establishes a fourth fixed forward speed ratio. An electric-only mode (in which the transmission is powered only by the motor/generator) may be achieved by adding a fourth brake that is selectively engageable to connect the input member with the stationary housing.

A method of operating the electro-mechanical transmission described above includes determining values of preselected vehicle operating characteristics at a first time at which the vehicle is characterized by a first operating state. The vehicle operating conditions may be vehicle speed, vehicle load, operator commands (such as accelerator input), motor speed and motor torque. The first operating state is one of the operating modes achievable by the transmission, such as a continuously variable operating mode characterized by a range of speed ratios or a fixed ratio mode. After the values are determined, they are analyzed according to an algorithm or look-up table stored in an electronic control unit to thereby identify a target operating state which includes identifying one of the continuously variable operating modes and a specific speed ratio at which the vehicle will be characterized by optimal energy efficiency given the vehicle operating characteristics determined. For instance, at a constant vehicle speed, vehicle load and operator command, the method determines the most efficient mode and speed ratio given the motor speed and motor torque available. Next, if the operating mode of the first operating state (i.e., the current operating state) is different than the operating mode of the target operating state, then the method includes engaging all of the torque-transmitting mechanisms that establish the identified operating mode which are not engaged in the first operating state and disengaging all of the torque-transmitting mechanisms that establish the first operating state that are not engaged in the identified operating mode to thereby establish the operating mode of the target operating state. Once the operating mode of the target operating state is established, the method includes controlling power flow between the battery and the motor/generator to target the speed ratio identified in the target operating state, which is either just approached or is in fact achieved, depending on the battery charge level available. The controlling step causes the battery to gradually reach either its maximum or minimum power level (depending on whether power is being supplied by or received by the battery) until net power flow from or to the battery is zero, at which point the transmission will be characterized by a fixed speed ratio established by the engaged torque-transmitting mechanisms of the identified operating mode. Thus, the method first seeks the most efficient operating state and then gradually moves away from the most efficient operating state towards the fixed speed ratio as the battery charge accumulates or depletes.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
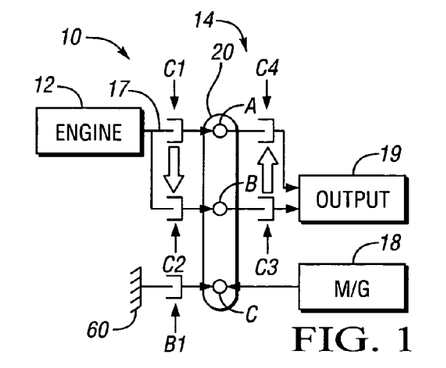
FIG. 1 is a schematic representation of one embodiment of a hybrid electro-mechanical transmission within the scope of the invention, represented in lever diagram form by a three node lever.

Referring to the drawings, wherein like reference numbers refer to like components, FIG. 1 shows a powertrain 10 including an engine 12 connected to one embodiment of an electro-mechanical transmission designated generally by the numeral 14. The transmission 14 is designed to receive at least a portion of its driving power from the engine 12. The engine 12 has an output shaft that is connectable to an input member 17 of the transmission 14. The input member 17 is selectively connectable to a gear set member of transmission 14 represented by a first node A of a lever 20 via a first clutch C1. The engine 12 is operatively connected to node A of the lever 20 when C1 is engaged. The lever 20 represents a simple planetary gear set, and may be referred to as such. The lever 20 includes the first node A as well as a second and third node B and C, respectively. The nodes A, B and C represent a first, second and third member of the planetary gear set 20, preferably a ring gear member, a carrier member and a sun gear member. Alternatively, the input member 17 is selectively connectable to the node B via a second torque-transmitting mechanism or clutch C2 to operatively connect the engine 12 to node B. A third torque-transmitting mechanism or clutch C3 selectively connects an output member 19 to the second node B. The output member 19 is operatively connected with a final drive mechanism for powering wheels of the vehicle (not shown), as will be well understood by those skilled in the art. Alternatively, the output member 19 may be selectively connected to the node A by a fourth torque-transmitting mechanism or clutch C4. A single motor/generator 18 is operatively connected to the third node C for providing power to the lever or receiving power therefrom. A brake B1 is selectively engageable to connect node C with the transmission housing 60.

Two continuously variable operating modes and three fixed ratio operating modes may be achieved by the transmission 14. Specifically, a first continuously variable operating mode is achieved by engaging clutches C1 and C3. A second continuously various operating mode is achieved by engaging clutches C2 and C4. A shift between the first continuously variable operating mode and the second continuously operating mode may be accomplished by releasing C1 and C3 while engaging C2 and C4. This shift is illustrated by the arrows in FIG. 1. This shift may be synchronous, that is it may be accomplished when the speeds of the members represented by nodes A and B are the same and therefore when the relative speeds across all of the clutches C1, C2, C3 and C4 are essentially zero immediately before, during, and immediately after the shift.

To establish the first fixed forward ratio, the brake B1 is engaged during the first continuously variable operating mode (i.e., while C1 and C3 are engaged). To establish the second fixed forward speed ratio, either C1 or C2 and both of C3 and C4 are engaged or both C1 and C2 and only one of C3 and C4 is engaged. Engagement of all of the clutches C1, C2, C3 and C4 also results in operation at the second fixed forward speed ratio. To establish the third fixed forward speed ratio, the brake B1 is engaged during the second continuously variable operating mode (i.e., while the clutches C2 and C4 are engaged).

Figure 2:
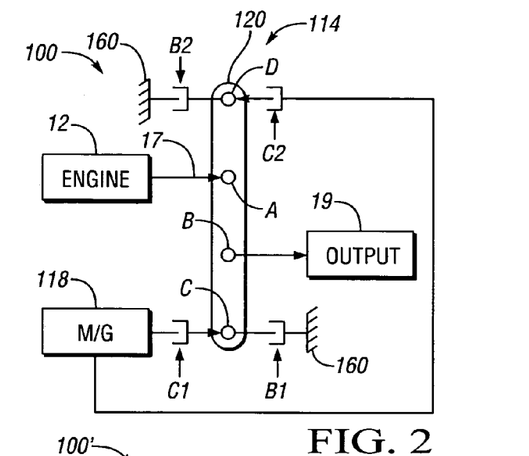
FIG. 2 is a schematic representation of another embodiment of a hybrid electro-mechanical transmission within the scope of the invention, represented in lever diagram form by a four node lever.

Referring to FIG. 2, a powertrain 100 has a compound planetary transmission 114 that is represented by the lever 120 which is a compound planetary gear set having four nodes: a first node A, a second node B, a third node C and a fourth node D. The engine 12 is continuously connected with the second node B via input member 17 and the output member 19 is continuously connected with the third node C. A single motor/generator 118 is selectively connectable to the third node C via the first torque-transmitting mechanism C1 or, alternatively, to the fourth node D via the clutch C2. A brake B1 selectively connects the third node C with the transmission housing 160 and a brake B2 selectively connects the fourth node D with the transmission housing 160. Like the three node lever 20 in the transmission 14 of FIG. 1, the transmission 114 with the four node lever 120 achieves two continuously variable operating modes and three fixed ratio operating modes. The transmission 114 requires only two clutches and two brakes to achieve these five operating modes. The first continuously variable operating mode is achieved with the engagement of clutch C1 to connect the motor/generator 118 to node C. The second continuously variable operating mode is achieved with the engagement of clutch C2 to connect the motor/generator 118 to node D. A shift between the first continuously variable operating mode and the second continuously variable operating mode may be accomplished synchronously by releasing clutch C1 while engaging clutch C2 when the speeds of nodes C and D are the same. A first fixed forward speed ratio is achieved with the engagement of the brake B1. A second fixed forward speed ratio is achieved with the engagement of both clutch C1 and clutch C2. A third fixed forward speed ratio is achieved with the engagement of the brake B2. The motor/generator 118 may be used in any of the operating modes by operatively connecting it to the lever 120 by means of engaging clutch C1 or C2, for assisting the engine in driving the vehicle or generating electricity for the battery and accessory power. Furthermore, the electric motor may rotate on its own for such useful purposes as driving mechanical vehicle accessories while the vehicle and engine are stopped by disengaging both clutches C1 and C2.

Figure 3:
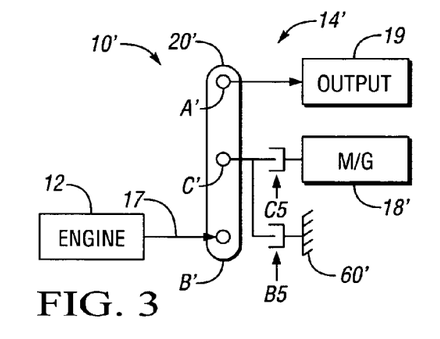
FIG. 3 is a schematic representation of another embodiment of a three node hybrid electro-mechanical transmission within the scope of the invention including a brake to achieve a fixed reverse speed ratio.

FIG. 3 illustrates that reverse may be achieved on a transmission 14' of powertrain 10'. The transmission 14' has a simple planetary gear set represented by lever 20' (having nodes A', B' and C') and a single motor/generator 18'. The engine 12 is continuously connected to node B' via input member 17. The output member 19 is continuously connected to node A'. A continuously variable operating mode is achieved by situating the motor/generator 18' such that it is connectable to node C' by a clutch C5. Additionally, a reverse fixed speed ratio is achieved by engaging a brake B5 that grounds the node C' to a transmission housing 60'.

Figure 4:
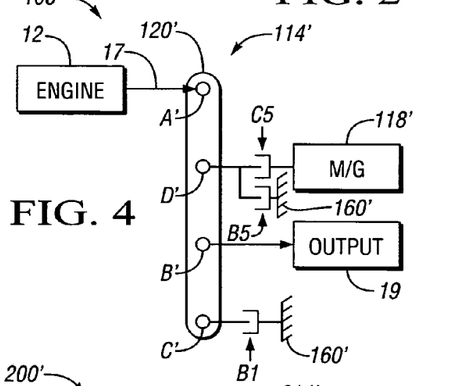
FIG. 4 is a schematic representation of another embodiment of a hybrid electro-mechanical transmission representable by a four node lever diagram within the scope of the invention, including a brake to achieve a fixed reverse speed ratio.

FIG. 4 illustrates that reverse may be achieved by a transmission 114' represented by a four node lever 120' (i.e., a compounded planetary gear set) of a powertrain 100'. The engine 12 is connected to the first node A' via input member 17 and the output member 19 is connected to a second node B'. A brake B1 selectively connects the third node C' to a transmission housing 160'. The motor/generator 118' is selectively connectable to the fourth node D' via clutch C5 to achieve a continuously variable operating mode. To achieve a fixed reverse speed ratio, a brake B5 selectively connects the node D' to the transmission housing 160'. By braking the lever 120' between the engine 12 and output 19, a fixed reverse speed ratio is achieved.

Figure 5:
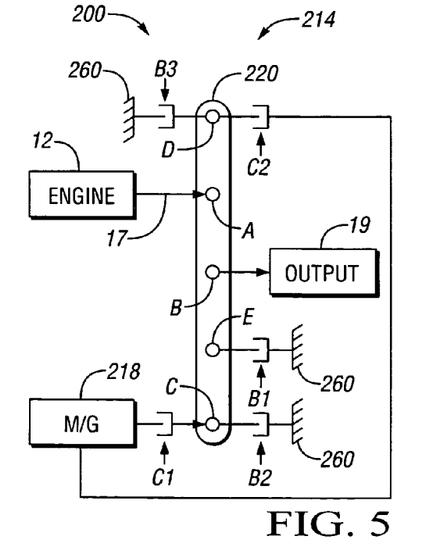
FIG. 5 is a schematic representation of another embodiment of a hybrid electro-mechanical transmission within the scope of the invention, represented in lever diagram form by a five node lever.

Referring to FIG. 5, a powertrain 200 having a transmission 214 with a five node lever 220 representing two or more interconnected planetary gear sets is shown. The five node lever includes a first node A, a second node B, a third node C, a fourth node D and a fifth node E. An engine 12 is continuously connected to the first node A via input member 17. An output member 19 is continuously connected with the second node B. A motor/generator 218 is selectively connectable with the third node C via a first torque-transmitting mechanism C1. Alternatively, the motor/generator 218 may be selectively connectable to the fourth node D via a second torque-transmitting mechanism C2. In an alternative embodiment, the first torque-transmitting mechanism C1 connects the motor/generator 218 to the fifth node E instead of the third node C. This alternative arrangement would require that the motor/generator 218 be capable of generating more torque than with the selective connections shown in FIG. 5. A first brake B1 selectively connects the fifth node E to the transmission housing 260. A second brake B2 selectively connects the third node C to the transmission housing 260 and a third brake B3 selectively connects the fifth node D to the transmission housing 260.

A first continuously variable operating mode is established with the engagement of C1 and a second continuously variable operating mode is established with the engagement of C2. A shift between the operating modes may be done by engaging C2 while disengaging C1, or vice versa. In addition to the two continuously variable operating modes, the transmission 214 may achieve four fixed forward speed ratios. The first forward fixed speed ratio is established with the engagement of the brake B1, and either the clutch C1 or the clutch C2 may be used to connect the motor/generator to rotate with the input and output. A second fixed forward speed ratio is established with the engagement of the brake B2, and the clutch C2 may be used to connect the motor/generator. A third fixed forward speed ratio is established with the engagement of both clutch C1 and C2. A fourth fixed forward speed ratio is established with the engagement of the brake B3, and the clutch C1 may be used to connect the motor/generator.

Figure 6:
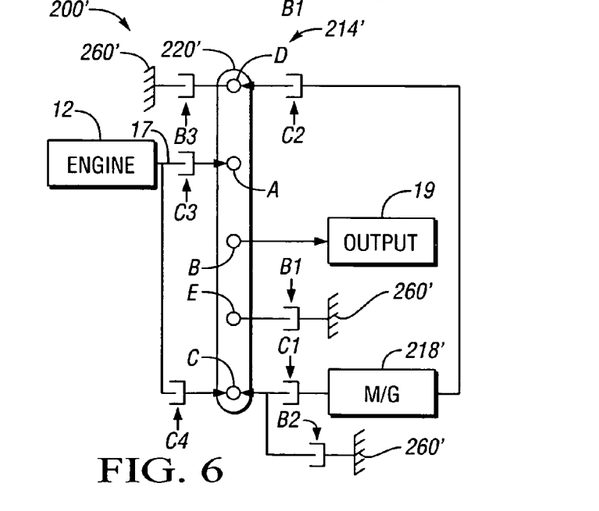
FIG. 6 is a schematic representation of another embodiment of a hybrid electro-mechanical transmission within the scope of the invention, represented by a five node lever diagram including two additional clutches to achieve a fixed reverse speed ratio.

Referring to FIG. 6, the powertrain 200 of FIG. 5 is modified slightly to achieve a powertrain 200' with a transmission 214' including a five node lever 220' by adding a third clutch C3 and a fourth clutch C4 which allow a reverse fixed forward speed ratio as described below. Clutch C1 selectively connects motor/generator 218' with node C. Clutch C2 selectively connects motor/generator 218' with node D. Brake B1 selectively connects node E with transmission housing 260'. Brake B2 selectively connects motor/generator 218' with node C. Brake B3 selectively connects node D with the transmission housing 260'. If C3 is engaged, the engine 12 is operatively connected to node A via input member 17 and the first and second continuously variable operating modes as well as the three fixed forward speed ratios described above with respect to FIG. 5 may be achieved by engaging the other torque-transmitting mechanisms required to establish such respective speed ratios as described above. However, if C3 is disengaged and C4 is engaged along with B1, a reverse fixed speed ratio is achieved. A continuously variable operating mode is achievable by engaging C2 and C4.

Figure 7A:
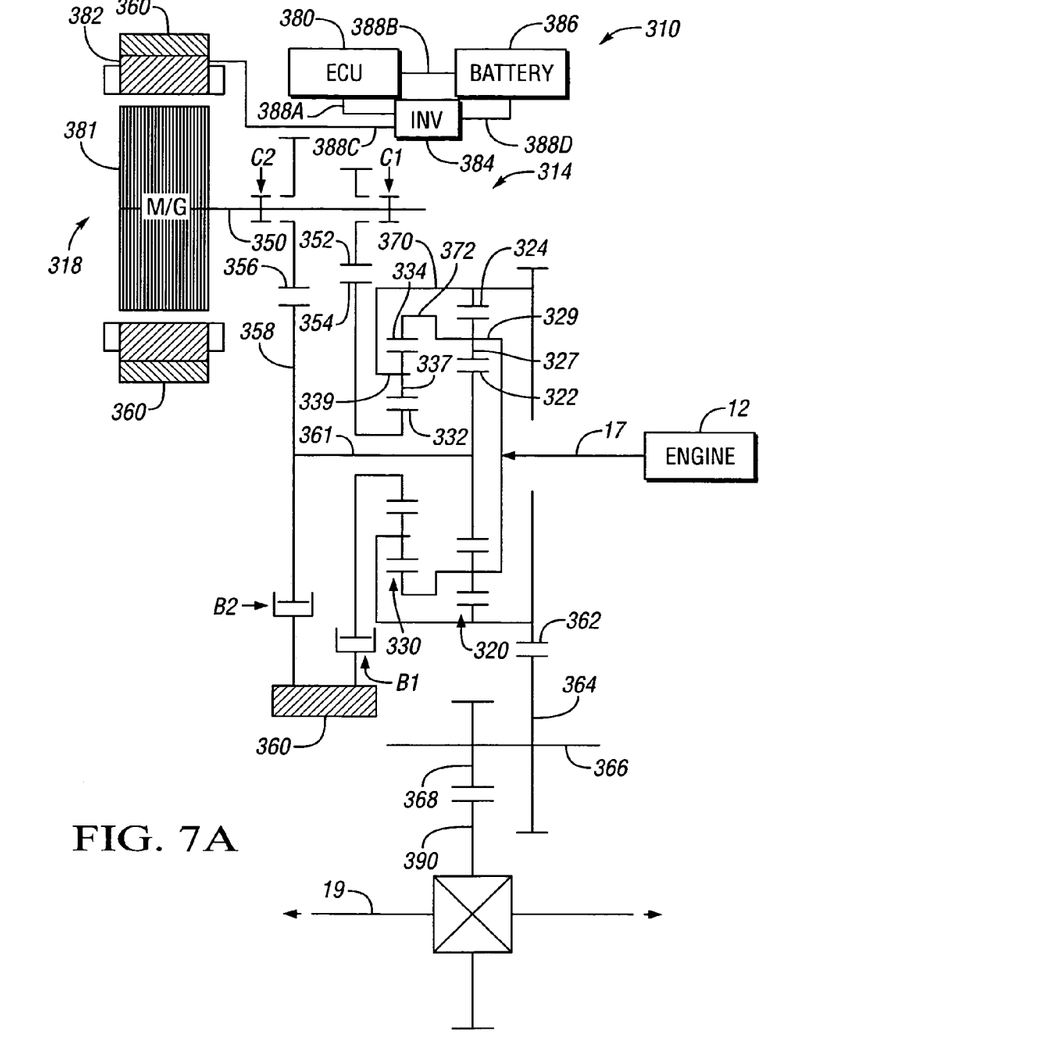
FIG. 7A is a schematic representation in stick diagram form of the transmission illustrated by the four node lever in FIG. 2, having an output countershaft arrangement.

Referring to FIG. 7A, a powertrain 310 having an electro-mechanical transmission 314 including a first planetary gear set 320 interconnected with a second planetary gear set 330 to form a four node lever (as will be discussed below) is illustrated. An engine 12 is connected to an input member 17. An electric motor/generator 318 includes a rotor portion 381 connected for rotation with a shaft 350 as well as a stator portion 382 grounded to a transmission housing 360. An electronic control unit (ECU) 380 is operatively connected to both a power inverter 384 and an electric storage device or battery 386. The electronic control unit 380 and the inverter 384 communicate via transfer conductors 388A. The electronic control unit 380 and the battery 386 communicate via transfer conductors 388B. The battery 386 is operatively connected to the motor/generator 318 through the power inverter 384 which is connected to the motor/generator 318 and the battery 386 via transfer conductors 388C and 388D, respectively. The ECU 380 may also communicate with the motor/generator 318 or other vehicle electrical components (not shown), such as electric power steering and electric power braking systems, etc.

The ECU 380 responds to a variety of input signals including vehicle speed, operator demand, the level at which the battery 386 is charged, the power being applied by the engine 12, and vehicle speed, to regulate the flow of power between the motor/generator 318 and the battery 386. The ECU 380 can manipulate the motor/generator 318 by means of the inverter 384 to act as either a motor or a generator. The ECU 380 also regulates the flow of power into and out of the battery 386 to the motor 318 via the power inverter 384.

The first planetary gear set 320 includes a sun gear member 322, a ring gear member 324 and a carrier member 329 which includes a plurality of pinion gears 327 that meshingly engage with both the sun gear member 322 and the ring gear member 324.

The second planetary gear set 330 includes a sun gear member 332, a ring gear member 334 and a carrier member 339. The carrier member 339 includes a plurality of pinion gears 337 that meshingly engage with both the sun gear member 332 and the ring gear member 334. The carrier member 339 is continuously connected with the ring gear member 324 via an interconnecting member 370 and the ring gear member 334 is continuously connected with the carrier member 329 via an interconnecting member 372.

Gears 352 and 356 rotate about the shaft 350. A first torque-transmitting mechanism, clutch C1, is selectively engageable to operatively connect gear 352 with shaft 350. Gear 352 intermeshes with gear 354 which is connected to and rotates with the sun gear member 332. A second torque-transmitting mechanism C2 is selectively engageable to operatively connect gear 356 with shaft 350. Gear 356 intermeshes with gear 358 which is connected for rotation with intermediate shaft 361.

A transfer gear 362 is connected for rotation with the ring gear member 324 and carrier member 339 and intermeshes with a transfer gear 364 which is connected for rotation with first transfer shaft 366. Second transfer gear 368 is also connected for rotation with first transfer shaft 366 and intermeshes with a differential or final drive mechanism 390 which is operatively connected to output member 19 or drive axle as is understood by those skilled in the art.

A first brake B1 is selectively engageable to connect gear 354 with the transmission housing 360 and a second brake B2 is selectively engageable to connect gear 358 with the transmission housing 360.

With respect to the lever diagram of FIG. 2, the interconnected ring gear member 334 and carrier member 329 function as first node A. The interconnected ring gear member 324 and carrier member 339 function as a second node B. The sun gear member 332 functions as third node C. The sun gear member 322 functions as fourth node D.

Figure 7B:
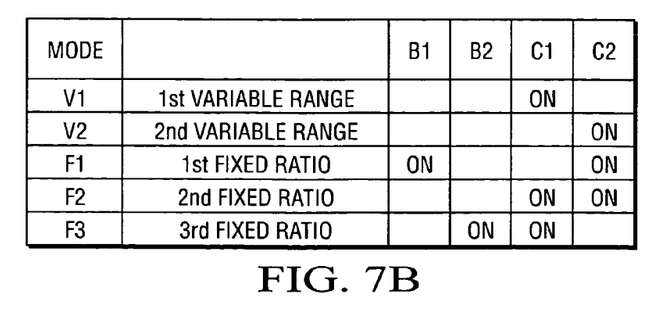
FIG. 7B is a truth table illustrating engaged torque-transmitting mechanisms to achieve various operating modes in the transmission of FIG. 7A.

Referring to FIG. 7B, a truth table indicates the five operating modes achievable by the transmission 314 of FIG. 7A. Engaged torque-transmitting mechanisms are labeled "ON." Specifically, a first continuously variable operating mode V1 allows a first variable range of speed ratios and is achieved by engagement of the first clutch C1. With the engagement of the first clutch C1, the motor is operatively connected through the shaft 350 to the sun gear member 332. The engine 12 is operatively connected through the input member 17 to the carrier member 229. The speed of the output member 19 is a combination of the speed of the input member 17 and the speed of the motor/generator shaft 350. Power flow from the motor/generator meets with power added by the engine 12 at the carrier member 339 and is provided to the output member 19 through the intermeshing gears 362, 364, 368 and the final drive mechanism 390. If the motor/generator 318 is controlled to operate as a generator in the first continuously variable operating mode V1, some of the power flowing from the engine 12 is directed from the carrier member 339 through the sun gear member 332 to the motor/generator 318 through the engaged clutch C1 and shaft 350, and then to the battery 386 under the control of the ECU 380.

Referring again to FIG. 7B, a second continuously variable operating mode V2 is achieved by engagement of the clutch C2. The speed of the output member 19 is a combination of the speed of the input member 17 and the speed of the motor/generator shaft 350. To shift from the first variable operating mode V1 to the second variable operating mode V2, the clutch C1 is disengaged as clutch C2 is engaged. Similarly, to shift from mode V2 to mode V1, clutch C2 is disengaged as clutch C1 is engaged. In the second continuously variable operating mode V2, power flows from the engine 12 to the carrier member 329. Power flows from the motor/generator 318 through the shaft 350 to intermeshing gears 356 and 358 via engaged clutch C2. Power then flows along intermediate shaft 361 to the sun gear member 322 where it is added to power flowing from the engine 12 at the carrier member 329. The power then flows from the ring gear member 324 to the carrier member 339 via the interconnecting member 370. Power is transferred through gears 362, 364, 368 and final drive mechanism 390 to output member 19. If the motor/generator 318 is controlled to operate as a generator in the mode V2, then power added by the engine 12 is directed from the carrier member 329 through the sun gear member 322, gears 358 and 356, and shaft 350 to the motor/generator and under the control of the ECU 380 to the battery 386.

As indicated in FIG. 7B, a first fixed forward speed ratio F1 is established with the engagement of the brake B1 and clutch C2. The engine 12 provides power to the input member 17 which is connected to the carrier member 329. The carrier member 329 rotates at the same speed as the ring gear member 334. The motor/generator 318 is operatively connected to the sun gear member 322, and rotates at a fixed speed ratio relative to the input member 17 or output member 19. Its torque and power are not necessary to regulate the speed ratio through the transmission 314 but it may be used as a motor to assist the engine 12 by using power from the battery 386 or as a generator to take power from the output member 19 and store it in the battery 386. The sun gear member 332 is grounded to the stationary housing 360 via the brake B1. The carrier member 339 and the ring gear member 324 are connected through the gears 362, 364, 368 and 370 to the output member 19. The ring gear/sun gear tooth ratios of both of the planetary gear sets 320 and 330 affect the numerical value of the fixed speed ratio.

A second fixed forward speed ratio F2 is established with the engagement of the clutches C1 and C2. The clutches C1 and C2 connect the gear members 352 and 356, respectively, with the shaft 350. By doing so, the sun gear members 322 and 332 are interconnected to rotate at a fixed speed ratio with one another, although not at the same speed if the ratio of gear member 356 to gear member 358 is different from the ratio of gear member 352 to gear member 354. Because the carrier member 327 is interconnected with the ring gear member 334, the carrier member 339 is continuously connected with the ring gear member 324 and the sun gear members 322 and 332 are operatively connected, a fixed forward speed ratio is achieved, as will be well understood by those skilled in the art.

A third fixed forward speed ratio is established with the engagement of the clutch C1 and the brake B2. The brake B2 grounds the sun gear member 322 to the transmission housing 360 by grounding gear 358. The engine 12 is connected to the carrier member 329 via the input member 17. The motor/generator 318 is connected to the sun gear member 332 via the shaft 350 and gears 352 and 354 due to engagement of the clutch C1. The motor/generator 318 rotates at a fixed speed ratio relative to the input member 17 or output member 19. Its torque and power are not necessary to regulate the speed ratio through the transmission 314 but it may be used as a motor to assist the engine 12 by using power from the battery 386 or as a generator to take power from the output member 19 and store it in the battery 386. The output member 19 is operatively connected to the ring gear member 324 as described above. The ring gear member 324 rotates at the same speed as the carrier member 329. The carrier member 339 rotates at the same speed as the ring gear member 324. This arrangement results in a fixed speed ratio between the input member 17 and the output member 19.

The interconnected carrier member 329 and ring gear member 334 function as the first node A of the four node lever 120 of FIG. 2. The interconnected ring gear member 324 and carrier member 339 function as the second node B of FIG. 2. The sun gear member 332 functions as the third node C of FIG. 2 and the sun gear member 322 functions as the fourth node D of FIG. 2.

Figure 8A:
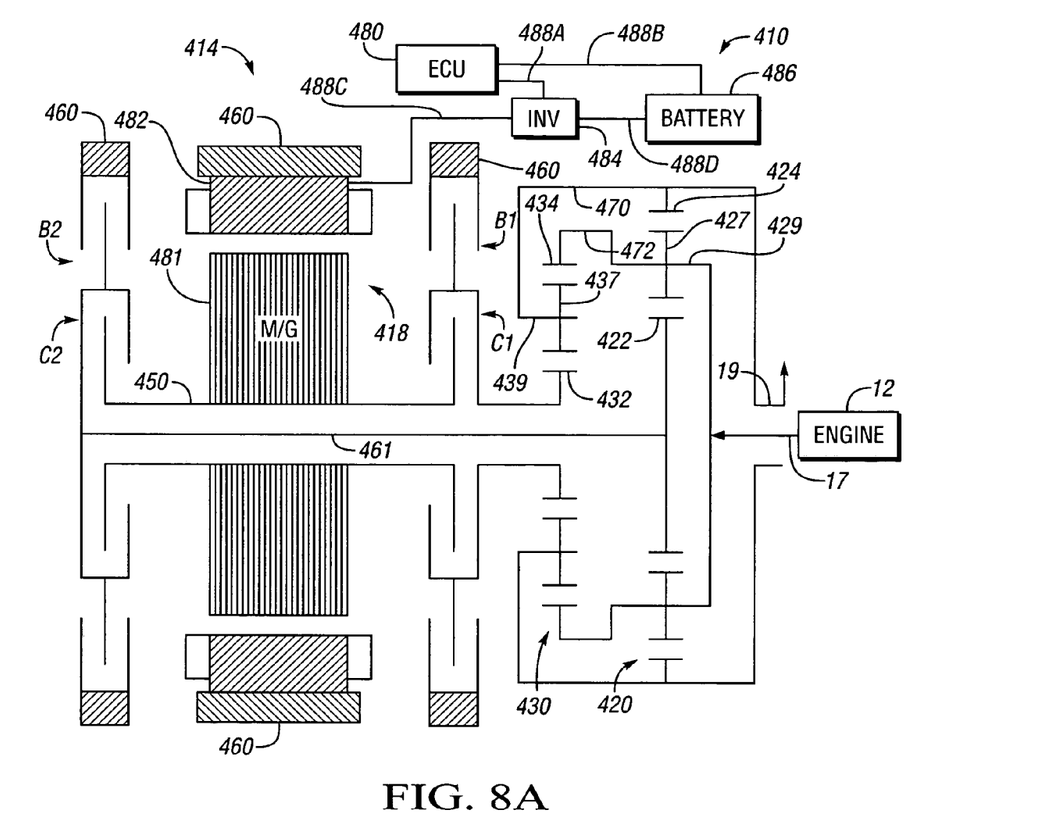
FIG. 8A is a schematic representation in stick diagram form of another four node hybrid electro-mechanical transmission as represented by the lever diagram in FIG. 2, having a coaxial layout.

Referring to FIG. 8A, a powertrain 410 has an electromechanical transmission 414 including a first planetary gear set 420 interconnected with a second planetary gear set 430 to form a four node lever (as will be discussed below). An engine 12 is connected to an input member 17. An electric motor/generator 418 includes a rotor portion 481 connected for rotation with a sleeve shaft 450 as well as a stator portion 482 grounded to a transmission housing 460. An ECU 480 is operatively connected to both an inverter 484 and an electric storage device or battery 486. The ECU 480 and the inverter 484 communicate via transfer conductors 488A. The ECU 480 and the battery 486 communicate via transfer conductors 488B. The battery 486 is operatively connected to the motor/generator 418 through a power inverter 484 which is connected to the motor/generator 418 and the battery 486 via transfer conductors 488C and 488D, respectively. The ECU 480 may also communicate with the motor/generator 418 or other vehicle electrical components (not shown), such as electric power steering and electric power brake systems, etc.

The ECU 480 responds to a variety of input signals including vehicle speed, operator demand, the level at which the battery 486 is charged and the power being applied by the engine 12 to regulate the flow of power between the motor/generator 418 and the battery 486. The ECU 480 can manipulate the motor/generator 418 by means of the inverter 484 to act as either a motor or a generator. The ECU 480 also regulates the flow of power into and out of the battery 486 to the motor 418 via the power inverter 484.

The first planetary gear set 420 includes a sun gear member 422, a ring gear member 424 and a carrier member 429 which includes a plurality of pinion gears 427 that meshingly engage with both the sun gear member 422 and the ring gear member 424.

The planetary gear set 430 includes a sun gear member 432, a ring gear member 434 and a carrier member 439. The carrier member 439 includes a plurality of pinion gears 437 that meshingly engage with both the sun gear member 432 and the ring gear member 434. The carrier member 439 is continuously connected with the ring gear member 424 via an interconnecting member 470 and the ring gear member 434 is continuously connected with the carrier member 429 via an interconnecting member 472.

A first torque-transmitting mechanism, clutch C1, is selectively engageable to operatively connect the motor/generator 418 with the sun gear member 432 by connecting the sleeve shaft 450 with the sun gear member 432.

A second torque-transmitting mechanism, clutch C2, is selectively engageable to operatively connect the motor/generator 418 with the inner shaft 461 and thereby to the sun gear member 422 which is connected for rotation with the inner shaft 461. The inner shaft 461 is coaxially aligned with the sleeve shaft 450. When engaged, the clutch C2 connects the sleeve shaft 450 with the inner shaft 461 for common rotation.

A first brake B1 is selectively engageable to connect the sun gear member 432 with the transmission housing 460. A second brake B2 is selectively engageable to connect the sun gear member 422 with the transmission housing 460 by grounding the inner shaft 461 to the transmission housing 460.

With respect to the four node lever diagram of FIG. 2, the interconnected ring gear member 434 and carrier member 429 function as the first node A. The interconnected carrier member 439 and ring gear member 424 function as the second node B. The sun gear member 432 functions as the third node C. The sun gear member 422 functions as a fourth node D.

Figure 8B:
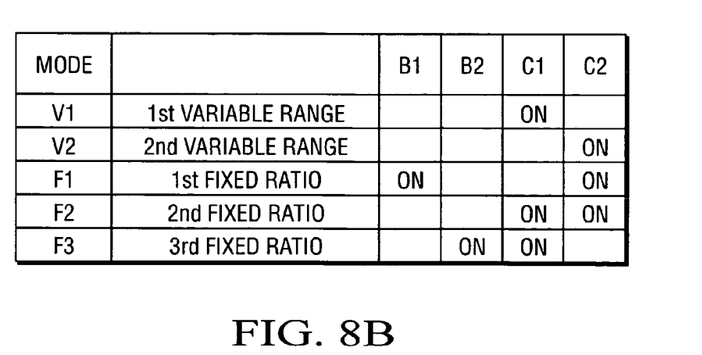
FIG. 8B is a truth table illustrating engaged torque-transmitting mechanisms to achieve various operating modes in the transmission of FIG. 8A.

Referring to FIG. 8B, a truth table indicates five operating modes achieved by the transmission 414 of FIG. 8A. In the truth table 8B, engaged torque-transmitting mechanisms are labeled "ON." Specifically, a first continuously variable operating mode V1 allows a first variable range of speed ratios and is achieved by the engagement of the first clutch C1. A second continuously variable operating mode V2 is achieved by engagement of the clutch C2. To shift from the first variable operating mode V1 to the second variable operating mode V2, the clutch C1 is disengaged as the clutch C2 is engaged. Similarly, to shift from mode V2 to mode V1, clutch C2 is disengaged as clutch C1 is engaged. A first fixed forward speed ratio F1 is established with the engagement of the brake B1 and the clutch C2. A second fixed forward speed ratio F2 is established with the engagement of both the clutches C1 and C2. A third fixed forward speed ratio is established with the engagement of the brake B2 and the clutch C1. As in the first and third fixed speed ratios described with respect to the transmission 314 of FIG. 7A, the clutches C1 and C2, respectively, may be engaged to allow the motor/generator 418 to add or remove power, but without affecting the speed ratio. Those skilled in the art will understand the power flow from the engine 12 and the motor/generator 418 to establish each of the continuously variable operating modes V1 and V2 and power flow from the engine 12 to establish the fixed ratio modes F1, F2 and F3, in light of the description of power flow in the various modes of the transmission 314 of FIG. 7A described above. For instance, in the first continuously variable operating mode V1, power flowing from the engine 12 through the carrier member 429 to the ring gear member 434 through the interconnecting member 472 is added at the carrier member 439 to power flowing from the motor/generator 418 to the sun gear member 432 via engaged clutch C1. The power then flows from the carrier member 439 to the output member 19 via the interconnecting member 470, as is apparent from the schematic illustration in FIG. 8A. Power may be transferred from output member 19 via a belt or chain to offset transfer shafts to power wheels of a vehicle having the transmission 414 (vehicle not shown). If the motor/generator 418 is controlled to operate as a generator in the first variable mode V1, then some of the power supplied by the engine 12 to carrier member 439 is relayed to the motor/generator 418 by the intermeshing pinion gear member 437 and sun gear member 432 through the sleeve shaft 450. Those skilled in the art will readily understand how the additional modes V2, F1, F2 and F3 are achieved in the transmission 414 of FIG. 8A.

Figure 9A:
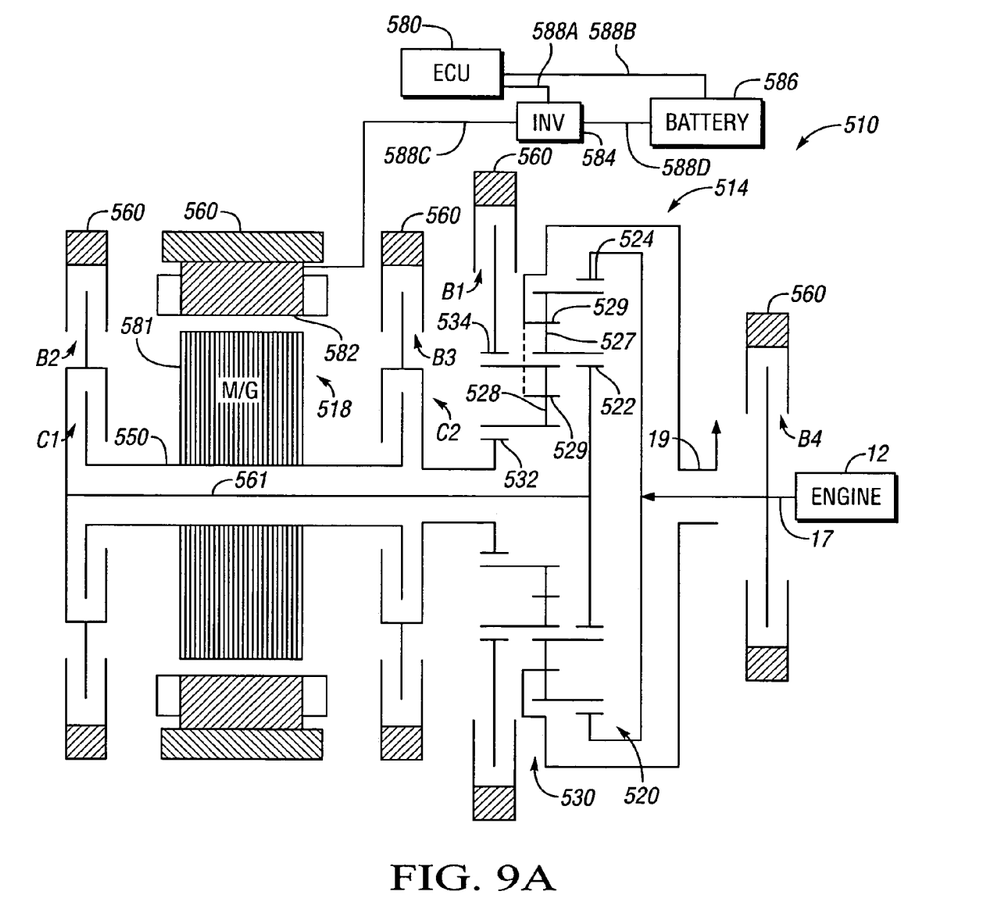
FIG. 9A is a schematic representation in stick diagram form of a hybrid electro-mechanical transmission as represented by the five node lever diagram of FIG. 5, having a coaxial layout.

Referring to FIG. 9A, a powertrain 510 has an electromechanical transmission 514 that includes a first planetary gear set 520 interconnected with a second planetary gear set 530 to form a five node lever (as will be discussed below). An engine 12 is connected with an input member 17. An electric motor/generator 518 includes a rotor portion 581 connected for rotation with a sleeve shaft 550 as well as the stator portion 582 mounted to a transmission housing 560. An ECU 580 is operatively connected to both a power inverter 584 and an electric storage device or battery 586. The ECU 580 and the inverter 584 communicate via transfer conductor 588A. The ECU 580 and the battery 586 communicate via transfer conductors 588B. The battery 586 is operatively connected to a motor/generator 518 through a power inverter 584 which is connected to the motor/generator 518 and the battery 586 via transfer conductors 588C and 588D, respectively. The ECU 580 may also communicate with the electric motor/generator 518 or other vehicle electrical components (not shown), such as electric power steering and electric power braking systems, etc. The ECU 580 responds to a variety of input signals including vehicle speed, operator demand, the level which the battery 586 is charged and the power being applied by the engine 12 to regulate the flow of power between the motor/generator 518 and the battery 586. The ECU 580 can manipulate the motor/generator 518 by means of the inverter 584 to act as either a motor or a generator. The ECU 580 also regulates the flow of power into and out of the battery 586 to the motor/generator 518 via the power inverter 584.

The first planetary gear set 520 includes a sun gear member 522, a ring gear member 524 and a carrier member 529 which rotatably supports both a first set of pinion gears 527 and a second set of pinion gears 528 (as indicated by dashed line). The first set of pinion gears 527 meshingly engages with the sun gear member 522, the ring gear member 524, and a second set of pinion gears 528. A second planetary gear set 530 includes a sun gear member 532 and a ring gear member 534. The second set of pinion gears 528 meshingly engages with the sun gear member 532, the ring gear member 534 and the first set of pinion gears 527. The common carrier member 529 is a double pinion type carrier having both the first and second set of pinion gears 527 and 528 and, because the first and second sets meshingly engage with each other and with other members of the first planetary gear set 520 and the second planetary gear set 530, the gear sets 520 and 530 are compounded. With respect to the five node lever diagram of FIG. 5, the ring gear member 524 functions as the first node A. The carrier member 529 functions as the second node B. The sun gear member 522 functions as the third node C. The sun gear member 532 functions as the fourth node D. The ring gear member 534 functions as the fifth node E.

A first torque-transmitting mechanism, clutch C1, is selectively engageable to operatively connect the motor/generator 518 with the sun gear member 522 by connecting a sleeve shaft 550 on which the motor/generator 518 is connected for common rotation with an inner shaft 561 that is coaxial with the sleeve shaft 550 and is connected for common rotation with the sun gear member 522.

A second torque-transmitting mechanism, clutch C2, is selectively engageable to operatively connect the motor/generator 518 with the sun gear member 532 by connecting the sleeve shaft 550 with the sun gear member 532 for common rotation. A first brake B1 is selectively engageable to ground the ring gear member 534 with the transmission housing 560. A second brake B2 is selectively engageable to ground the sun gear member 522 with the transmission housing 560. A third brake B3 is selectively engageable to ground the sun gear member 532 to the transmission housing 560. A fourth brake B4 is selectively engageable to ground the input shaft 17 to the transmission housing 560.

Figure 9B:
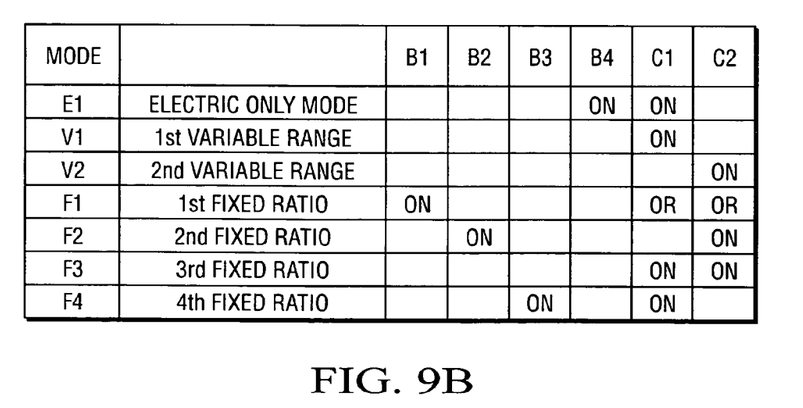
FIG. 9B is truth table illustrating engaged torque-transmitting mechanisms to achieve various operating modes in the transmission of FIG. 9A.

Referring to FIG. 9B, a truth table indicates seven operating modes achievable by the transmission 514 of FIG. 9A. Engaged torque-transmitting mechanisms in each of the operating modes are labeled "ON", or "OR" if alternate engagements are possible. Specifically, an electric-only mode, E1, is established with the engagement of the brake B4 and the clutch C1. With the engagement of the brake B4, the input member 17 is grounded to the transmission housing 560. Thus, the output member 19 is powered by the motor/generator 518 alone, creating an electric-only mode.

A first continuously variable operating mode V1 is established with the engagement of the clutch C1. With the engagement of the clutch C1, when the motor/generator 518 is controlled to function as a motor, power from the motor/generator 518 is added at sun gear member 532 to power from the engine 12 which is added at the ring gear member 524 by the input member 17. Thus, the power from the two sources, the engine 12 and the motor/generator 518, flows through the pinion gears 527 and 528 to the carrier member 529 and thereby to the output member 19.

The second continuously variable operating mode V2 is established with the engagement of the clutch C2. With the clutch C2 engaged, power from the motor/generator 518 is added to the transmission gearing at the sun gear member 532. Power from the engine 12 is added at the ring gear member 524. Power from the two respective sources, the engine 12 and motor/generator 518, is thus added through the intermeshing sets of pinion gears 527 and 528 to the carrier member 529 and thereby to the output member 19.

Four fixed forward speed modes are also achievable by the transmission 514. Specifically, a first fixed forward speed ratio is established with the engagement of the brake B1 and either engagement of clutch C1 or of clutch C2. A second fixed forward speed ratio F2 is established with the engagement of the brake B2 and the clutch C2. Engagement of the clutch C2 allows the motor/generator 518 to add or remove power but does not affect speed ratio. A third fixed forward speed ratio is established with the engagement of both of the clutches C1 and C2. A fourth fixed forward speed ratio is established with the engagement of the brake B3 and the clutch C1. Engagement of the clutch C1 allows the motor/generator 518 to add or remove power but does not affect speed ratio. Those skilled in the art will readily understand power flow through the transmission 514 in each of the modes indicated in the truth table of FIG. 9B.

Figure 10:
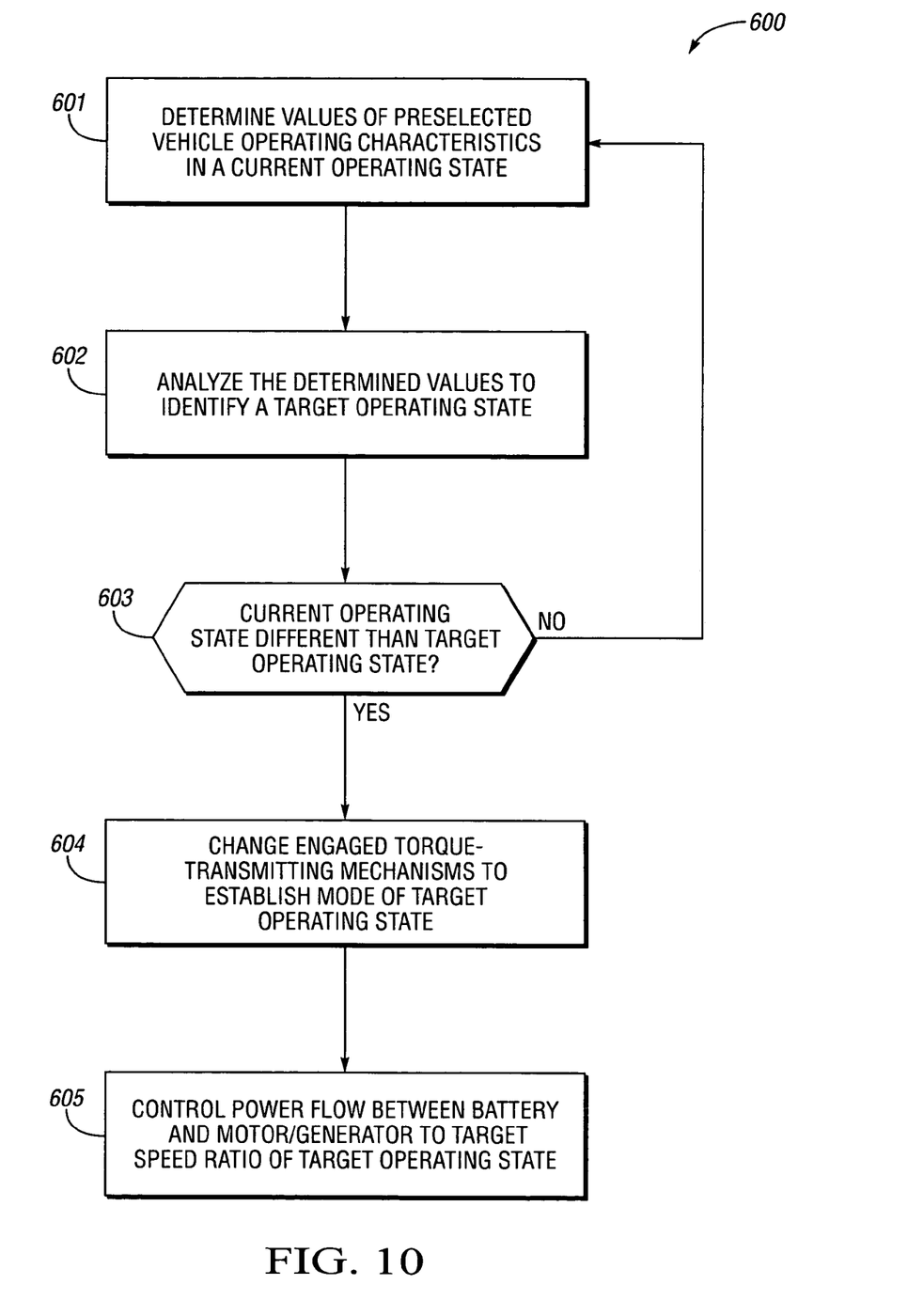
FIG. 10 is a flow diagram illustrating a method of controlling a hybrid electro-mechanical transmission.

FIG. 10 illustrates a method 600 of operating an electromechanical transmission having a single motor/generator such as described in any of the embodiments of FIGS. 1 through 8B above. An ECU, such as is shown in FIGS. 7A, 8A and 9A, carries out the steps of the method 600. The method 600 begins with step 601 in which an ECU determines the value of preselected vehicle operating characteristics at a current time when the vehicle is characterized by a current operating state. The current operating state includes the mode, in which the transmission is currently functioning, whether a continuously variable operating mode or a fixed ratio mode, as well as the specific current speed ratio of the transmission. The current operating state may also include a specific current motor speed and motor torque. The vehicle operating characteristics may include vehicle speed, vehicle load and vehicle operator input such as acceleration, steering and braking input. The vehicle operating characteristics may be relayed to the ECU in order for the ECU to accomplish the determining step by sensors located at relevant points in the vehicle such as on the wheels, the engine, the motor/generator, etc., as will be well understood by those skilled in the art.

Next, the method 600 includes an analyzing step 602 in which the ECU analyzes the determined values to identify a target operating state. The target operating state identified includes one of the continuously variable modes achievable by the transmission as well as a specific speed ratio within the range of the identified continuously variable mode. The analysis may be done according to a stored algorithm or by comparison of the determined values with stored reference values to thereby identify the target operating state. The target operating state is the most efficient mode and speed ratio in which the transmission can operate given the motor speed and motor torque available and under the other vehicle operating characteristics such as vehicle speed, vehicle load and vehicle operator input, the latter three of which are assumed to remain constant throughout the method 600. The electronic control unit then determines in step 603 whether the current operating state is different than the identified target operating state. If the states are the same, then the transmission continues running in the current operating state and the method 600 returns to step 601. However, if the states are different, then in step 604, the ECU changes the engaged torque-transmitting mechanisms to establish the mode of the target operating state. This involves engaging all of the torque-transmitting mechanisms that establish the operating mode of the target operating state that are not engaged in the current operating state and disengaging all of the torque-transmitting mechanisms that establish the first operating state and that are not engaged in the operating mode of the target operating state, to thereby establish the operating mode of the target operating state. Once torque-transmitting mechanisms are engaged according to step 604, in step 605 the ECU controls power flow between the battery connected with the motor/generator (such as battery 386 of FIG. 7A) to target the speed ratio of the target operating state. In other words, power flows either from the battery to the motor/generator (if the motor/generator is required to operate as a motor in the target operating state) or from the motor/generator to the battery (if the motor/generator is required to operate as a generator in the target operating state). Under this control scheme, motor speed will adjust so that the transmission approaches and preferably achieves the target speed ratio of the target operating state. Depending on the charge in the battery when step 605 is undertaken, the target speed ratio may not be achieved. That is, the battery may reach a maximum charge level before the target speed ratio is achieved or may reach a minimum charge level before the target speed ratio is achieved. When either the maximum or minimum charge level is reached in the battery, power flow from or to the motor/generator is no longer possible and the transmission operates in a fixed ratio mode defined by the torque-transmitting mechanisms engaged in step 604.

While the best modes for carrying out the invention have been described in detail, those familiar with the art to which this invention relates will recognize various alternative designs and embodiments for practicing the invention within the scope of the appended claims.

The invention claimed is:

1. An electro-mechanical transmission comprising:
an input member to receive power from an engine;
an output member for delivering power from the transmission;
a single motor/generator, wherein the transmission is characterized by an absence of another motor/generator affecting power flow between the input member and the output member;
at least one differential gear set having a plurality of members including at least a first member, a second member and a third member;
wherein said input member, said output member and said motor/generator are each operatively connectable with different ones of said members of said at least one differential gear set;
a first torque-transmitting mechanism selectively engageable to establish a first continuously variable operating mode characterized by a first range of speed ratios; and
a second torque-transmitting mechanism selectively engageable to establish a second continuously variable operating mode characterized by a second range of speed ratios;
wherein engagement of one of said first and second torque-transmitting mechanisms and disengagement of the other of said first and second torque-transmitting mechanisms to shift between said respective continuously variable operating modes can be accomplished with essentially zero relative speed across both of said torque-transmitting mechanisms while both of said input member and output member are rotating.

2. The electro-mechanical transmission of claim 1, wherein engagement of said first torque-transmitting mechanism operatively connects said single motor/generator with one of said members of said at least one differential gear set; and
wherein engagement of said second torque-transmitting mechanism operatively connects said single motor/generator with another of said members of said at least one differential gear set.

3. The electro-mechanical transmission of claim 1, wherein said at least one differential gear set is a simple planetary gear set.

4. The electro-mechanical transmission of claim 3, wherein said at least one differential gear set is representable by a first lever of a lever diagram having a first, a second and a third node; wherein said first torque-transmitting mechanism is a first clutch selectively engageable to connect the input member with said first node, wherein said second torque-transmitting mechanism is a second clutch selectively engageable to connect the input member with said second node, wherein the motor/generator is operatively connected with said third node; and further comprising:
a third clutch selectively engageable to operatively connect said output member with said second node;
a fourth clutch selectively engageable to operatively connect said output member with said first node; and
a first brake selectively engageable to ground said third node to a stationary member;
wherein said first and third clutches are engaged to establish said first continuously variable operating mode, wherein said second and fourth clutches are engaged to establish said second continuously variable operating mode; and wherein said first clutch, said third clutch and said brake are engaged to establish a first fixed forward speed ratio, wherein a second fixed forward speed ratio is established either by engagement of only one of said first and second clutches and both of said third and fourth clutches or by engagement of both of said first and second clutches and only one of said third and fourth clutches, and wherein said second clutch, said fourth clutch and said brake are engaged to establish a third fixed forward speed ratio.

5. The electro-mechanical transmission of claim 1, wherein said at least one differential gear set is representable by a first level of a lever diagram having a first, a second, a third and a fourth node; wherein said input member is operatively connectable with said first node; wherein said output member is continuously connected with said second node; wherein engagement of said first torque-transmitting mechanism connects said motor/generator with said third node; and wherein engagement of said second torque-transmitting mechanism connects said motor/generator with said fourth node.

6. The electro-mechanical transmission of claim 5, wherein said first lever is characterized by an absence of any additional nodes.

7. The electro-mechanical transmission of claim 6, wherein said first torque-transmitting mechanism is a first clutch, wherein said second torque-transmitting mechanism is a second clutch; and further comprising:
a first brake selectively engageable to ground said third node to a stationary member; and
a second brake selectively engageable to ground said fourth node to a stationary member;
wherein engagement of said first brake establishes a first fixed forward speed ratio; wherein engagement of said first clutch and said second clutch establishes a second fixed forward speed ratio; and wherein engagement of said second brake establishes a third fixed forward speed ratio.

8. The electro-mechanical transmission of claim 6, wherein said at least one differential gear set has a first and a second planetary gear set each having a ring gear member, a sun gear member and a carrier member, and wherein said first and second planetary gear sets are compounded such that two of said members of said first planetary gear set are each continuously connected to a different respective member of said second planetary gear set.

9. The electro-mechanical transmission of claim 5, wherein said first lever further includes a fifth node.

10. The electro-mechanical transmission of claim 9, wherein said first lever is characterized by an absence of any additional nodes.

11. The electro-mechanical transmission of claim 10, wherein said first torque-transmitting mechanism is a first clutch, wherein said second torque-transmitting mechanism is a second clutch, and further comprising:
a first brake selectively engageable to operatively connect said fifth node with a stationary member;
a second brake selectively engageable to operatively connect said third node with said stationary member; and
a third brake selectively engageable to operatively connect said fourth node with said stationary member;
wherein engagement of said first brake establishes a first fixed forward speed ratio;
wherein engagement of said second brake establishes a second fixed forward speed ratio;
wherein engagement of said first and second clutches establishes a third fixed forward speed ratio; and
wherein engagement of said third brake establishes a fourth fixed forward speed ratio.

12. The electro-mechanical transmission of claim 11, further comprising:
a fourth brake selectively engageable to connect said input member with said stationary housing;
wherein said first clutch and said fourth brake are engaged to establish an electric forward mode in which the transmission is powered only by said motor/generator.

13. The electro-mechanical transmission of claim 10, wherein said first torque-transmitting mechanism is a first clutch, wherein said second torque-transmitting mechanism is a second clutch; and further comprising:
a first brake selectively engagable to ground said fifth node to a stationary member;
a second brake selectively engagable to ground said third node to said stationary member;
a third brake selectively engagable to ground said fourth node to said stationary member; and
a fourth brake selectively engagable to ground said input member to said stationary member;
wherein engagement of said first brake establishes a first fixed forward speed ratio; wherein engagement of said second brake establishes a second fixed forward speed ratio; wherein engagement of said first clutch and said second clutch establishes a third fixed forward speed ratio; and wherein engagement of said third brake establishes a fourth fixed forward speed ratio.

14. A method of operating an electro-mechanical transmission having an input member to receive power from an engine, an output member for delivering power from the transmission, a single motor/generator operatively connected to a battery for receiving power from the battery to act as a motor and for delivering power to the battery to act as a generator, wherein the battery is characterized by a maximum and a minimum charge, wherein the transmission is characterized by an absence of another motor/generator affecting power flow through the transmission, at least one differential gear set having a plurality of members, wherein the input member and said motor/generator are each operatively connectable with a different respective one of the members of said at least one differential gear set, a plurality of torque-transmitting mechanisms, wherein different ones of the torque-transmitting mechanisms are selectively engagable to establish different respective operating modes including at least one continuously variable mode characterized by a range of speed ratios and at least one fixed ratio mode having the same engaged torque-transmitting mechanisms as said at least one continuously variable mode, the method comprising:
determining values of pre-selected vehicle operating characteristics in a current operating state of the transmission characterized by one of said operating modes, one of said speed ratios, a motor speed and a motor torque, said vehicle operating characteristics including vehicle speed, vehicle load and vehicle operator inputs;
analyzing the determined values to thereby identify a target operating state characterized by one of said operating modes and one of said speed ratios and at which the vehicle will be characterized by optimal energy efficiency for said determined values;
if the operating mode of the current operating state is different than the operating mode of the target operating state, engaging all of the torque-transmitting mechanisms that establish the operating mode of the target operating state and that are not engaged in the current operating state and disengaging all of the torque-transmitting mechanisms that establish the first operating state and that are not engaged in the operating mode of the target operating state to establish the operating mode of said target operating state; and
controlling power flow between the battery and the motor/generator to target the speed ratio of the target operating state, thereby causing the battery to reach one of the maximum and the minimum charge and the transmission to be characterized by a fixed speed ratio established by the engaged torque-transmitting mechanisms of the operating mode of the target operating state.

15. The method of claim 14, wherein different ones of the torque-transmitting mechanisms are selectively engagable to establish at least two continuously variable operating modes including a first continuously variable operating mode and a second continuously variable operating mode; wherein the operating mode of the current operating state is one of the first and the second continuously variable mode and the operating mode of the target operating state is the other of the first and the second continuously variable mode; and wherein the engaging and disengaging steps are synchronous.

16. A method of operating an electro-mechanical transmission on a vehicle, the transmission having a single motor/generator in power flow communication with a battery and having continuously variable modes, each including a range of speed ratios, and fixed ratio modes, comprising:
determining values of pre-selected vehicle operating characteristics at a current time when the vehicle is characterized by a current operating state characterized by one of said modes;
analyzing the determined values to thereby identify a target operating state characterized by one of said continuously variable modes and a speed ratio within the range of speed ratios of the continuously variable mode of the target operating state;
if the mode of the current operating state is different than the mode of the target operating state, changing the engaged torque-transmitting mechanisms to establish the mode of the target operating state; and
controlling power flow between the battery and the motor/generator to target the speed ratio of the target operating state, thereby causing the charge of the battery to be one of a minimum and a maximum level wherein net battery power flow is zero and the transmission is therefore characterized by a fixed speed ratio established by the engaged torque-transmitting mechanisms of the target operating state.

17. The method of claim 16, wherein the continuously variable modes include a first continuously variable mode and a second continuously variable mode, said first and second continuously variable modes being established by engagement of different ones of the torque-transmitting mechanisms; wherein the operating mode of the current operating state is one of the first and the second continuously variable modes and the operating mode of the target operating state is the other of the first and the second continuously operating modes; and wherein said engaging and disengaging steps are synchronous.

* * * * *